(No Model.)
T. A. EDISON.
MANUFACTURE OF INCANDESCING ELECTRIC LAMPS.
No. 271,613. Patented Feb. 6, 1883.
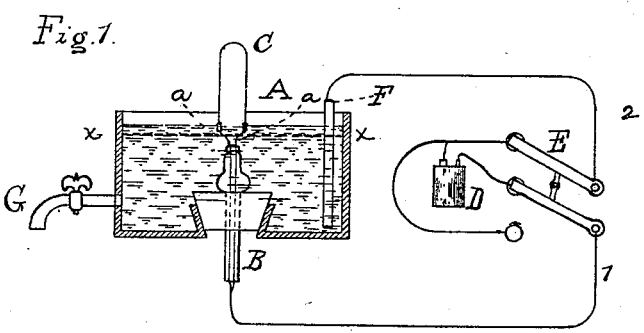
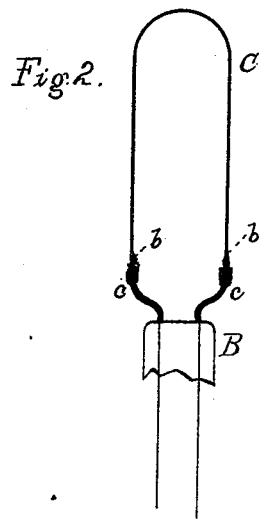
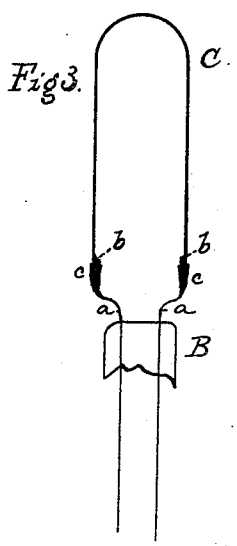
WITNESSES:
INVENTOR:
Thomas A. Edison
By Rich'd N. Dyer
Atty

UNITED STATES PATENT OFFICE.

THOMAS A. EDISON, OF MENLO PARK, NEW JERSEY.

MANUFACTURE OF INCANDESCING ELECTRIC LAMPS.

SPECIFICATION forming part of Letters Patent No. 271,613, dated February 6, 1883.

Application filed September 13, 1882. (No model.)

*To all whom it may concern:*

Be it known that I, THOMAS A. EDISON, of Menlo Park, in the county of Middlesex and State of New Jersey, have invented a new and useful Improvement in the Manufacture of Incandescing Lamps, (Case No. 478,) of which the following is a specification.

In my incandescing electric lamps the carbon incandescing conductor is attached to the wires which convey the current thereto by the electro-deposition of metal at the points of union.

In carrying out this process the interior stem or tube of the lamp having the wires sealed in it and the carbon temporarily attached by any ordinary mechanical means to said wires is placed in an electro-depositing cell, together with a copper plate forming the anode, and copper is deposited on such wires and the ends of the carbon, forming a secure joint.

Heretofore I have placed the tube in the lamp with the wires covered with copper over the entire length above the glass. I have, however, found it desirable to have as little metal as possible inside the lamp, so that the gases and vapors occluded in such metal may be more readily and completely removed during the process of exhaustion.

The object of this invention, therefore, is to produce a lamp which shall have only a small amount of electro-deposited metal, just enough to complete the joint, placed only upon the ends of the leading-in wires. I accomplish this by placing the glass wire-support in the electro-depositing cell upright, and with the top of the liquid in the cell a little below the upper edges of the enlarged ends of the carbon. A suitable copper anode is provided, the wires and carbon forming the cathode. Copper is deposited as usual over the entire length of the wires above the glass. After this a portion of the solution is removed from the vessel by means of a faucet provided for that purpose until the liquid falls to a little below the enlarged ends. The current through the cell is then reversed, the wires becoming the anode and the copper plate the cathode, when the metal is removed from said wires and deposited on said plate, leaving only that which forms the union between the carbon and wires. Instead of removing a portion of the liquid from the cell, the stopper in the bottom of the cell which holds the glass-support (as described in my Patent No. 248,436) may be pushed up farther, so as to raise the proper portion of the wires out of the liquid.

In the drawings, Figure 1 is a view of the apparatus employed in my invention; Fig. 2, a view of the carbon and wires as they appear after the first stage of the process, and Fig. 3 a view of the same when completed and ready to be placed in the lamp.

A is the electro-depositing cell; B, the glass wire-support; $a\ a$, the leading-in wires, and C the carbon, having enlarged ends $b\ b$. D is a battery, and E a circuit-reverser, from which wires 1 2 run respectively to the leading-in wires $a\ a$ and to the anode F of the cell. The liquid is originally of the height shown, but is afterward removed by the faucet G, as set forth, to the level of the dotted line $x\ x$. In Fig. 2 the wires $a\ a$ are entirely covered with electro-deposited copper $c$, while in Fig. 3 there is only enough copper, $c$, left on the wires and carbon to make a proper joint.

What I claim is—

1. The method of forming an electroplated joint between the wires and carbon in an incandescing electric lamp, consisting in first depositing metal upon the ends of the carbon and the entire length of the wires above the glass, and then removing said metal from the lower parts of said wires, substantially as set forth.

2. The method of forming an electroplated joint between the wires and carbon in an incandescing electric lamp, consisting in first depositing metal upon the ends of the carbon and the entire length of the wires above the glass, then changing the relative level of the electrolytic liquid, so as to leave a small portion of the wires above said liquid, and then reversing the current through the cell, substantially as set forth.

3. The method of forming an electroplated joint between the wires and carbon in an incandescing electric lamp, consisting in first depositing metal upon the ends of the carbon and the entire length of the wires above the glass, then removing a portion of the liquid from the electro-depositing cell, and then reversing the current through the cell, substantially as set forth.

4. The combination of an electro-depositing cell, a copper plate, and the carbon and leading-in wires of an incandescing lamp, forming the electrodes of the cell, means for changing the level of the liquid in the cell relative to such wires and carbon, and means for changing the direction of the current through the cell, substantially as set forth.

This specification signed and witnessed this 25th day of August, 1882.

THOS. A. EDISON.

Witnesses:
H. W. SEELY,
EDWARD H. PYATT.